Aug. 8, 1944.  H. LINKOWSKI  2,355,452
SHAKER CONVEYER
Filed May 16, 1942  2 Sheets-Sheet 1
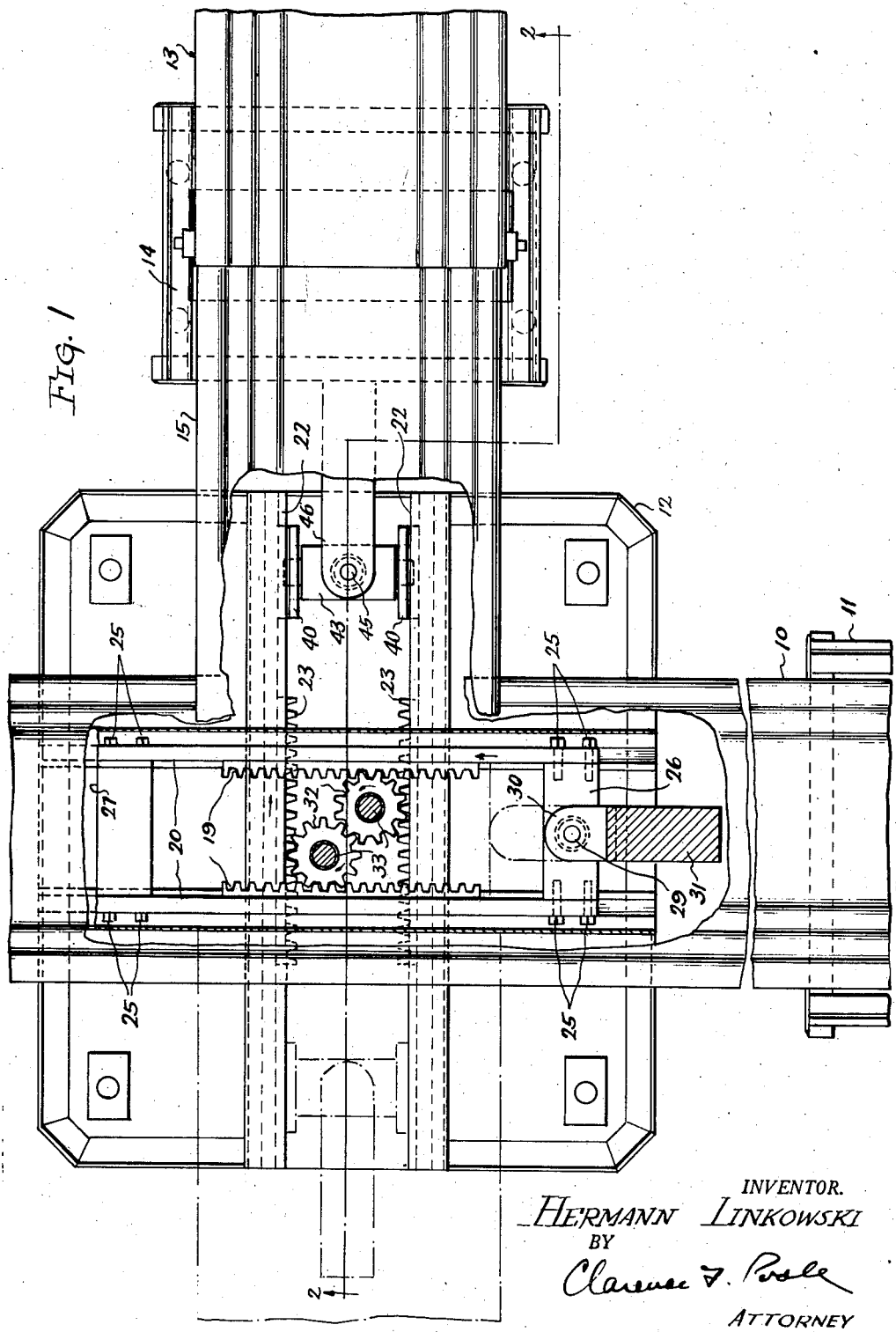
INVENTOR.
Hermann Linkowski
BY
Clarence F. Poole
ATTORNEY Aug. 8, 1944. H. LINKOWSKI 2,355,452
SHAKER CONVEYER
Filed May 16, 1942 2 Sheets-Sheet 2
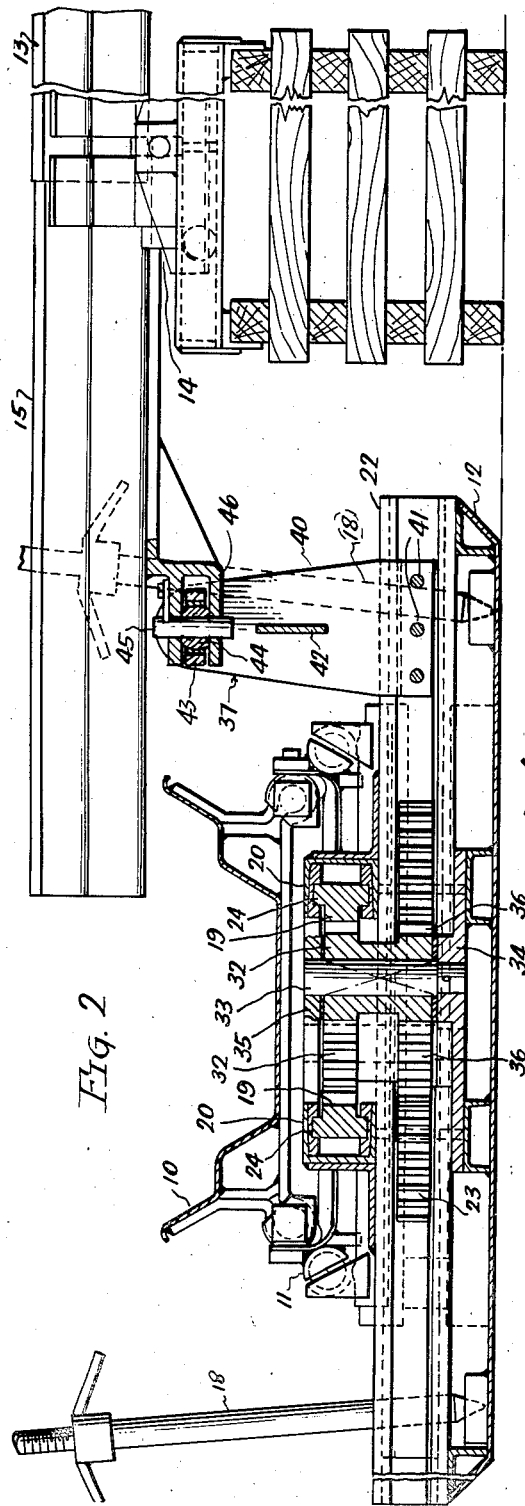
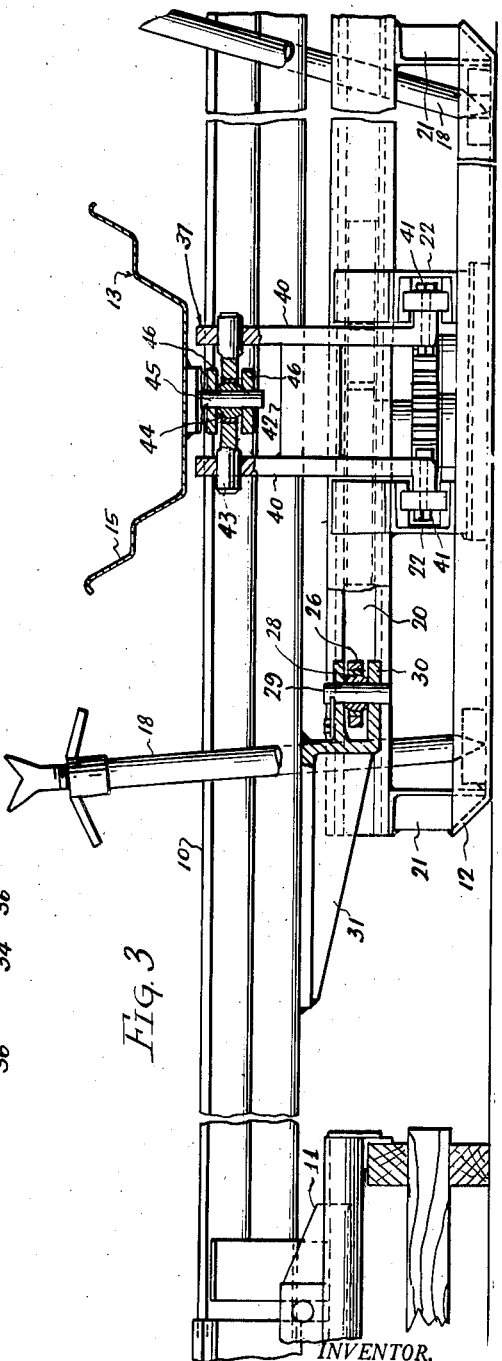
INVENTOR.
HERMANN LINKOWSKI
BY
ATTORNEY Patented Aug. 8, 1944

2,355,452

UNITED STATES PATENT OFFICE 2,355,452

SHAKER CONVEYER

Hermann Linkowski, Chicago, Ill., assignor to Goodman Manufacturing Company, Chicago, Ill., a corporation of Illinois Application May 16, 1942, Serial No. 443,228

5 Claims. (Cl. 198—220)

This invention relates to improvements in shaker conveyers and more particularly relates to an improved means for driving one trough section of a shaker conveyer from another when the driven trough section is horizontally displaced with respect to the driving trough section.

The principal objects of my invention are to provide a new and improved drive means of a novel and simplified construction for positively driving a branch shaker conveyer from a main line shaker conveyer when horizontally displaced with respect to the main line conveyer.

A more specific object of my invention is to provide an efficient and simplified form of positive geared drive connection for transferring the conveying motion of a shaker conveyer at an angle to the main line conveyer, including racks and pinions arranged at angles with respect to each other, for driving a branch shaker conveyer at an angle to the main shaker conveyer at the same conveying motion as the conveying motion of the driving trough section of the main line conveyer.

Other objects of my invention will appear from time to time as the following specification proceeds and with reference to the accompanying drawings wherein:

Figure 1 is a top plan view of an angle drive constructed in accordance with my invention, with parts of the trough sections broken away and certain parts of the drive shown in horizontal section;

Figure 2 is a fragmentary transverse sectional view taken through the main line conveyer and the angle drive mechanism; and Figure 3 is a view in side elevation of the angle drive with the branch conveyer trough and the drive connection thereto shown in section.

Referring now in particular to the embodiment of my invention illustrated in the drawings, a reciprocating trough section 10 of a shaker conveyer trough line is shown as being mounted on ball frames 11, 11 in the usual manner and as extending over a base 12 for the angle drive mechanism, one of said ball frames being partially shown in Figures 1 and 3 and the other ball frame being shown in Figure 2. Said trough section 10 is driven from a usual form of shaker conveyer drive mechanism at the discharge end of the trough line, and not herein shown or described in detail since it is no part of my present invention.

A branch line conveyer 13 is shown as extending at right angles to the trough section 10, for discharging material into said trough section. Said branch line conveyer is mounted adjacent its discharge end on a usual form of ball frame 14 and includes a discharge trough section 15 projecting rearwardly of said ball frame and arranged in cascade relationship with respect to the trough section 10.

Referring now in particular to certain novel features of my invention and the angle drive mechanism for driving the branch line conveyer from the main line conveyer, said drive mechanism is mounted on the base 12, which is held in position on the ground by means of a plurality of jacks 18, 18, interposed between said base and the mine roof. A pair of facing racks 19, 19 are slidably mounted in said base in parallel spaced facing guides 20, 20 and are reciprocably driven with respect to said base by means of the trough section 10. Said guides extend beneath and are in alignment with the trough section 10 and are spaced above and supported on the base 12, adjacent their ends, on support members 21, 21, mounted on and projecting upwardly from said base. Said guides are supported intermediate their ends on guides 22, 22, extending transversely of said first mentioned guides and having facing racks 23, 23 slidably mounted therein, which form a means for driving the discharge conveyer 13.

The guides 20, 20 are of a gibbed formation to receive gibs 24, 24, projecting upwardly and downwardly from the racks 19, 19, and clearance is provided between the insides of said racks and guides to accommodate cap screws 25, 25, which secure transverse connecting members 26 and 27 to said racks, adjacent their outer ends (see Figure 1).

The drive connection between the driving trough section 10 and the racks 19, 19, for driving said racks, includes a semi-ball-shaped member 28 pivotally mounted in the transverse connecting member 26. A pivotal pin 29 extends through said semi-ball-shaped member and is pivotally connected adjacent its ends to a bifurcated portion 30 of a connecting member 31, which is secured to and depends from the bottom of the trough section 10.

The means for reciprocably driving the racks 23, 23 from the racks 19, 19 includes a pair of meshing spur pinions 32, 32, which mesh with said racks 19, 19. Said pinions, as herein shown, are journaled on vertical shafts 33, 33, which are secured at their lower ends to a support member 34, mounted on said base and forming a support for the central portion of said lower racks. Said shafts are mounted at their upper ends in a cross member 35, connected between said guides 20, 20. A pair of meshing spur pinions 36, 36 are herein shown as being formed integral with and spaced beneath the meshing pinions 32, 32. Said pinions mesh with and reciprocably drive the racks 23, 23 in the guides 22, 22.

An upright connecting member 37 is provided to drive the branch conveyer 13 from the trough section 10. Said connecting member, as herein shown, includes a pair of upright plate members 40, 40 secured to the insides of the racks 23, 23 by means of nuts and bolts 41, 41, and connected together intermediate their ends by a transverse brace 42. A drive member 43 is horizontally pivoted between the upper ends of said plate members. Said drive member has a semi-ball-shaped member 44 journaled therein, through which extends a pin 45 having connection at its upper and lower ends with a forked connecting member 46 secured to and depending from the bottom of the trough section 15, for reciprocably driving said trough section and the branch line conveyer 13. If desired, another connecting member similar to the connecting member 37 may be provided at the opposite ends of said racks, for driving another branch line conveyer extending from the trough section 10 in an opposite direction from the trough section 15, as is shown by broken lines in Figure 1.

It may be seen from the foregoing that when the base 12 is held in position on the ground by means of the jacks 18, 18, that reciprocable movement of the trough section 10 will drive the meshing pinions 32, 32 in opposite directions. This will reciprocably drive the racks 23, 23 through the meshing pinions 36, 36 and will drive the branch line conveyer 13 at the same drive motion as the drive motion of the main line conveyer. It may here be noted that the driven racks 23, 23 may be at various angular positions with respect to the driving racks, if desired, or that the branch trough line may be pivoted at a horizontal angle to said racks. It is preferable, however, to change the angular position of the racks rather than pivot the driven trough section with respect to the racks, in order to impart a motion to the driven trough section which is in alignment with the direction of flow of material along said trough section.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer angle drive, a driving trough section, a driven trough section arranged at a horizontal angle with respect to said driving trough section, and means for driving said driven trough section from said driving trough section including a pair of facing racks connected with said driving trough section and reciprocably driven thereby, a pair of facing racks having driving connection with said other trough section, for driving said other trough section, and a geared drive connection between said racks, for driving one pair of racks from the other.

2. In a shaker conveyer angle drive, a driving trough section, a driven trough section arranged at a horizontal angle with respect to said driving trough, and means for driving said driven trough section from said driving trough section including a pair of racks reciprocably driven by one trough section, another pair of racks having connection with said other trough section, and a pair of meshing gears oscillatively driven by said first mentioned racks and forming a reciprocable drive means for said second mentioned racks.

3. In a shaker conveyer angle drive, a base, a driving trough section mounted for reciprocable movement with respect to said base, a driven trough section mounted for reciprocable movement with respect to said base at a horizontal angle with respect to said driving trough section, and means for reciprocably driving said driven trough section from said driving trough section including a pair of laterally spaced facing racks slidably guided on said base and extending longitudinally of and reciprocably driven by said driving trough section, a pair of meshing gears journaled on said base and meshing with said racks, a pair of facing racks slidably guided on said base for reciprocable movement in a direction transverse to said first mentioned racks and having drive connection with said driven trough section, and a drive connection from said gears to said racks for reciprocably driving said racks with respect to said base.

4. In a shaker conveyer angle drive, a base, a driving trough section mounted for reciprocable movement with respect to said base, a driven trough section mounted for reciprocable movement with respect to said base at a horizontal angle with respect to said driving trough section, and means for reciprocably driving said driven trough section from said driving trough section including a pair of laterally spaced facing racks extending longitudinally of and reciprocably driven by said driving trough section and guided on said base for reciprocable movement with respect thereto, a pair of facing racks guided on said base for reciprocable movement with respect thereto in a direction transverse to said first mentioned racks and crossed by said first mentioned racks, a drive connection between said second mentioned racks and said driven trough section for driving said trough section from said racks, and a geared drive connection at the points where said racks cross each other for driving said second mentioned racks from said first mentioned racks.

5. In a shaker conveyer angle drive, a base, a driving trough section mounted for reciprocable movement with respect to said base, a driven trough section mounted for reciprocable movement with respect to said base at a horizontal angle with respect to said driving trough section, and means for reciprocably driving said driven trough section from said driving trough section including a pair of laterally spaced facing racks extending longitudinally of and reciprocably driven by said driving trough section and guided on said base for reciprocable movement with respect thereto, a pair of facing racks guided on said base for reciprocable movement with respect thereto in a direction transverse to said first mentioned racks and crossed by said first mentioned racks, a drive connection between said second mentioned racks and said driven trough section for driving said trough section from said racks, and a geared drive connection at the points where said racks cross each other, for driving said second mentioned racks from said first mentioned racks including a pair of meshing spur gears journaled on said base and meshing with said first mentioned racks and forming a means for reciprocably driving said second mentioned racks.

HERMANN LINKOWSKI.